United States Patent
Pacchiana et al.

(10) Patent No.: US 6,797,094 B2
(45) Date of Patent: Sep. 28, 2004

(54) PROCESS FOR THE PRODUCTION OF A BRAKING BAND WITH VENTING PASSAGES AND BRAKING BAND OBTAINED WITH SAID PROCESS

(75) Inventors: Giovanni Paolo Pacchiana, Locate (IT); Ralf Siegfried Goller, Bergamo (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/451,339

(22) PCT Filed: Dec. 22, 2000

(86) PCT No.: PCT/IT00/00543
§ 371 (c)(1),
(2), (4) Date: Jun. 23, 2003

(87) PCT Pub. No.: WO02/051771
PCT Pub. Date: Jul. 4, 2002

(65) Prior Publication Data
US 2004/0035659 A1 Feb. 26, 2004

(51) Int. Cl.$^7$ .......................... C04B 33/34; C04B 37/00; C01B 31/00
(52) U.S. Cl. ................. 156/89.26; 156/89.11; 156/89.25; 264/29.6; 264/29.2; 264/113; 264/125; 264/250; 264/257; 264/332
(58) Field of Search ............................. 156/89.11, 89.25, 156/89.26

(56) References Cited

U.S. PATENT DOCUMENTS

| | | | | |
|---|---|---|---|---|
| 3,895,084 A | * | 7/1975 | Bauer | 156/89.26 |
| 4,506,724 A | * | 3/1985 | Vial | 164/436 |
| 4,867,668 A | * | 9/1989 | Miyairi | 425/192 R |
| 5,413,471 A | * | 5/1995 | Yamauchi | 425/129.1 |
| 5,635,226 A | * | 6/1997 | Koda et al. | 425/529 |
| 6,042,935 A | * | 3/2000 | Krenkel et al. | 428/307.7 |
| 6,086,814 A | * | 7/2000 | Krenkel et al. | 264/610 |
| 6,231,329 B1 | * | 5/2001 | Van Keuren, III | 425/169 |
| 6,280,174 B1 | * | 8/2001 | Lichtinger | 425/437 |
| 6,305,925 B1 | * | 10/2001 | Cassani | 425/405.1 |
| 6,342,750 B1 | * | 1/2002 | Braungardt et al. | 310/323.18 |
| 6,572,356 B2 | * | 6/2003 | Seger | 425/192 R |
| 2002/0090409 A1 | * | 7/2002 | Seger | 425/193 |

FOREIGN PATENT DOCUMENTS

| | | |
|---|---|---|
| DE | 44 38 456 A1 | 5/1996 |
| DE | 19834571 A1 | 2/2000 |

OTHER PUBLICATIONS

International Search Report dated Sep. 9, 2001, for PCT/IT00/00543.

* cited by examiner

Primary Examiner—Stephen J. Lechert, Jr.
(74) Attorney, Agent, or Firm—Hogan & Hartson L.L.P.

(57) ABSTRACT

The present invention relates to a process for the production of a braking band for a brake disk with venting passages and to a braking band which can be produced by the process. The process comprises the following steps:

molding a core (200) of the braking band in a suitable mold (1), molding two covers (8) onto the core in a further suitable mold (101) so as to form a semi-finished product having a "sandwich" structure, firing the semi-finished product so as to produce a predetermined porosity of the covers, firing the semi-finished product further, in the presence of silicon, at a temperature such as substantially to bring about fusion of the silicon and its infiltration into the covers.

16 Claims, 9 Drawing Sheets

PROCESS FOR THE PRODUCTION OF A BRAKING BAND WITH VENTING PASSAGES AND BRAKING BAND OBTAINED WITH SAID PROCESS

This application is a 371 of PCT/IT00/00543, filed Dec. 22, 2000.

FIELD OF THE INVENTION

The present invention relates to a process for the production of a braking band for a brake disk with venting passages, and a braking band produced by the process.

In particular, the present invention relates to a process for the production of a braking band which has venting passages and is made of a ceramic material such as, for example C/SiC.

BACKGROUND OF THE INVENTION

In general, braking bands with venting passages which are currently available on the market are produced by two different processes.

The first process provides for the moulding of the braking band as a solid body and for the subsequent formation of radial and non-radial holes lying in a central plane of the thickness of the band and thus constituting the venting passages.

The second process provides for a first step for the moulding of two reflectively symmetrical portions of the braking band having grooves in their facing surfaces. The two portions are then brought into contact and glued to form the finished product in which each groove of each of the portions represents one half of a venting duct.

However, the above-mentioned solutions have some disadvantages.

In the first process, the formation of the holes in the thickness of the braking bands is undoubtedly very difficult because of the hardness of the materials which have to be used in production.

The second process, on the other hand, has the great disadvantage that it is necessary to glue two portions of a braking band which, since they are formed separately, may not correspond and may therefore fit together incorrectly. This could give rise to a product which might easily be subject to dangerous detachment of these two portions.

As a result, there is a need to provide a process for the production of braking bands with venting passages which is particularly easy to implement and effective, as well as braking bands produced by the process.

SUMMARY OF THE INVENTION

The problem upon which the present invention is based is therefore to devise a process for the production of braking bands which has characteristics such as to satisfy the above-mentioned requirements and at the same time to overcome the disadvantages of the processes of the prior art.

This problem is solved by a process for the production of a braking band having venting passages, comprising the following steps:
moulding a core of the braking band in a suitable mould,
moulding two covers onto the core in a further suitable mould so as to form a semi-finished product having a "sandwich" structure,
firing the semi-finished product so as to produce a predetermined porosity of the covers,
firing the semi-finished product further, in the presence of silicon, at a temperature such as substantially to bring about fusion of the silicon and its infiltration into the covers.

Further characteristics and the advantages of the process for the production of braking bands, as well as the braking bands produced by the process according to the present invention, will become clear from the following description of some preferred embodiments thereof, given by way of non-limiting example with reference to the appended drawings.

DETAILED DESCRIPTION OF THE INVENTION

The process according to the present invention provides for the moulding of a core in which venting passages are defined and for the subsequent moulding of two covers onto the core so as to produce a semi-finished product with a "sandwich" structure.

With reference to FIGS. 1 to 5, the core is advantageously produced by a process which provides, first of all, for the moulding of two half-cores in which grooves of the venting passages are defined and, subsequently, for the joining-together of the half-cores to produce the core.

In detail, the process provides for the steps of:
a) providing a suitable mould,
b) preparing a mixture comprising a predetermined quantity of fibres and/or filaments constituted substantially by carbon, and a predetermined quantity of an organic binder,
c) depositing the mixture in the suitable mould,
d) moulding a first half-core in the mould,
e) moulding a second half-core by repeating steps a) to d),
f) fixing the first and second half-cores together to produce the core in which venting passages are defined.

The mixture for moulding the half-cores preferably comprises fibres and/or filaments of carbon-based materials selected from the group consisting of wood and products of the processing of wood, vegetable fibres, thermosetting resins, and products produced by pyrolysis of substances of synthetic origin such as, for example, polyacrylonitrile (PAN) and polysilazane.

In particular, these materials comprise sawdust or chippings and the like, hemp, and similar textile fibres. Moreover, the filaments derived from these materials are variable from 3000 to 50000 units and have diameters of between 2 and 3 μm. These filaments may also be chopped to lengths of less than 30 mm.

These materials are mixed with an aggregating resin such as, for example, polyurethane or, more preferably, a phenolic resin, pitches, and other additives.

Once prepared, this mixture is deposited in the moulding cavity of the mould and subjected to heating to temperatures generally of between 80° C. and 180° C., and to compression to produce a half-core.

A further half-core is produced by repeating precisely the same process as described above.

Figure 2:
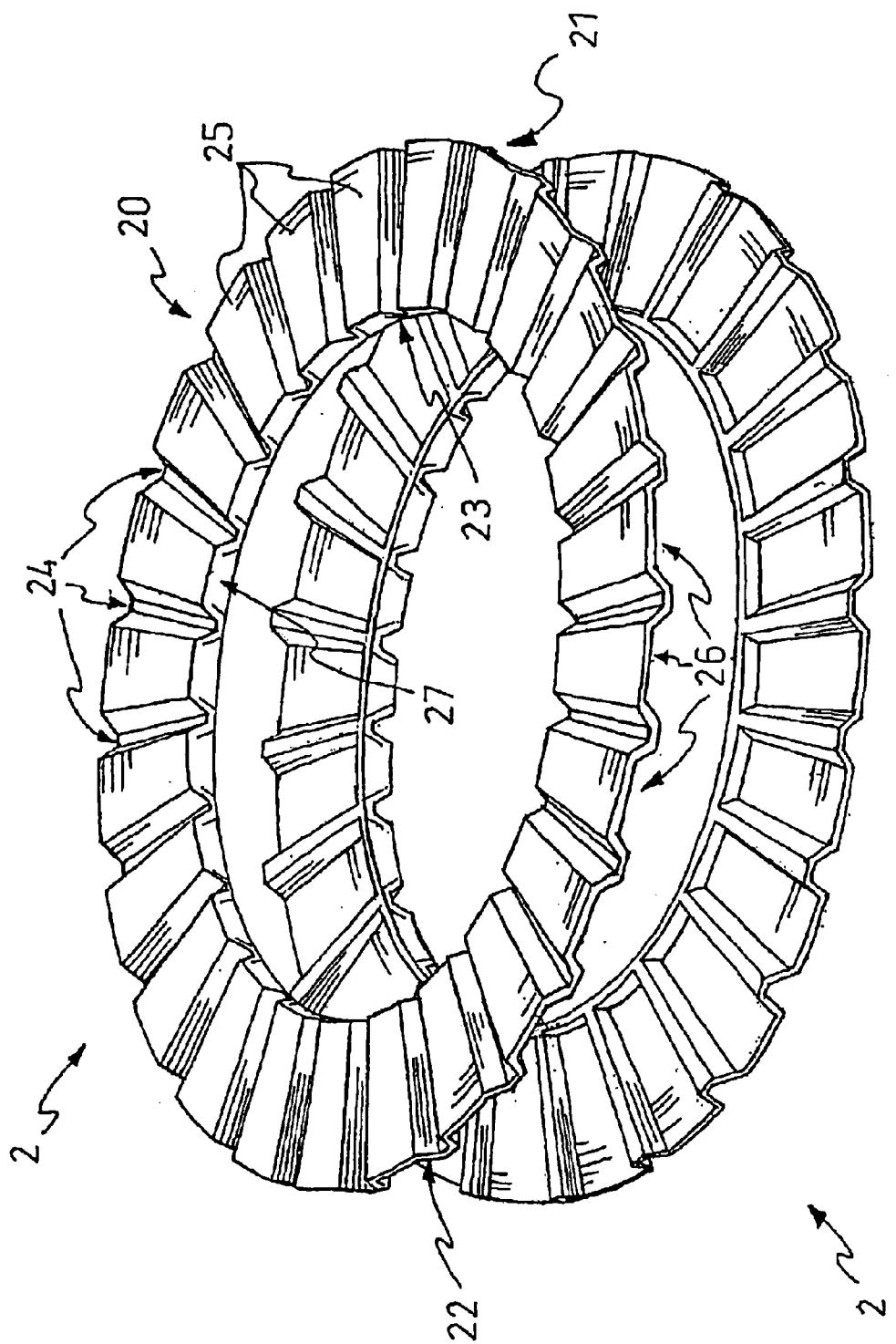
FIG. 2 is a perspective view of two facing half-cores produced with the mould of FIG. 1.
Figure 3:
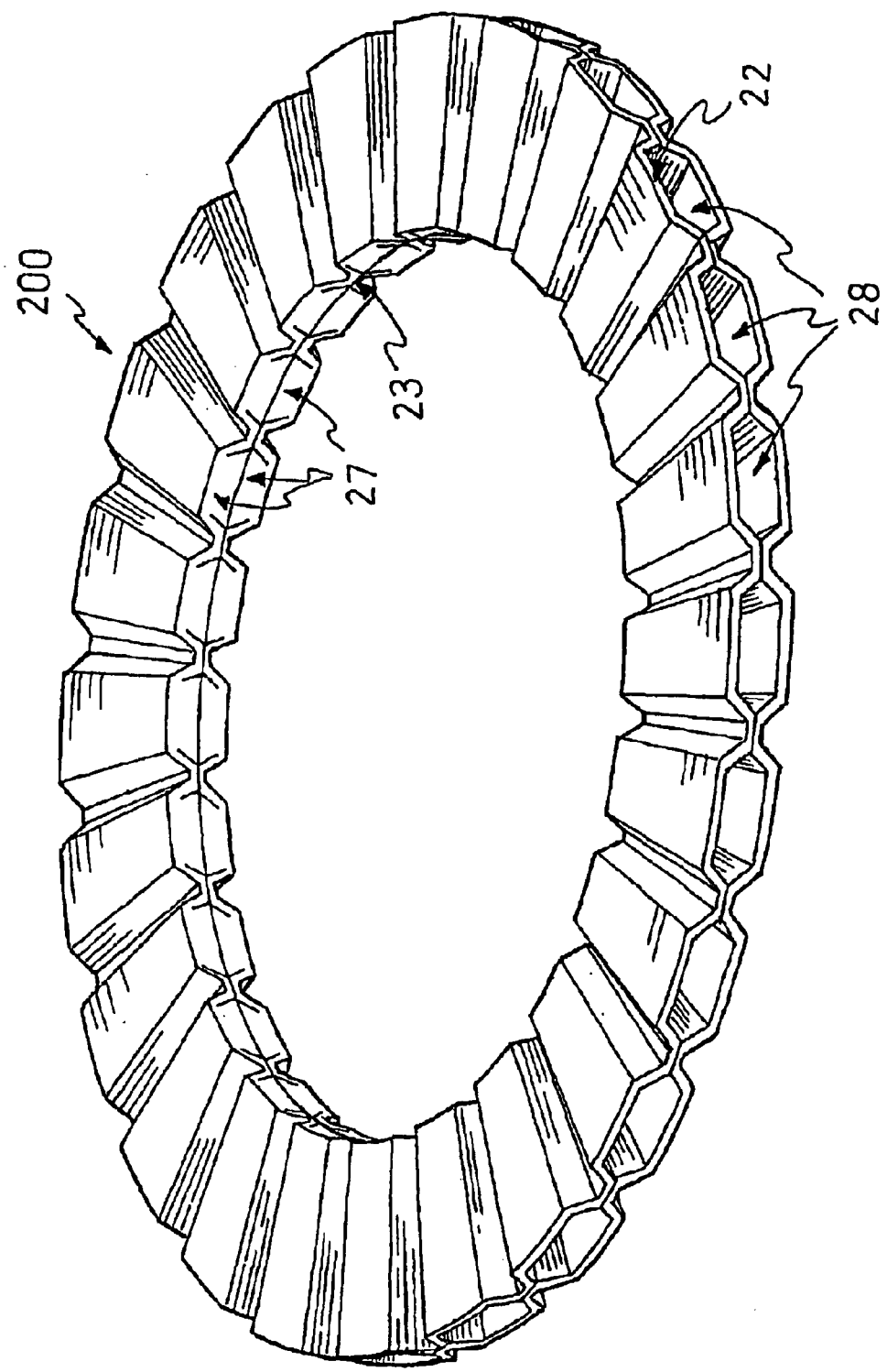
FIG. 3 is a perspective view of a core of a braking band produced by the joining-together of the two half-cores of FIG. 2.

The two half-cores thus produced are then juxtaposed so as to fit the grooves of the venting passages together and are fixed to one another as shown schematically in FIGS. 2 and 3, preferably by gluing with a liquid thermosetting resin. More preferably, the resin is a phenolic resin.

If the gluing takes place when the two half-cores are still hot, that is, when they have just come out of the mould, the gluing resin advantageously sets immediately. There is consequently no need for further heating processes to bring about setting of the resin.

The next step of the process for the production of a braking band according to the present invention requires the provision of a further mould in which the core previously produced is inserted in order for two covers to be moulded around the core.

This step of the moulding of the covers will now be described with reference to FIGS. 4 and 5. The term "cover" is intended to define the outer portion of the braking band which covers the core of the band and therefore constitutes the braking surface which is acted on, for example, by the pads of a disk brake.

Figure 4:
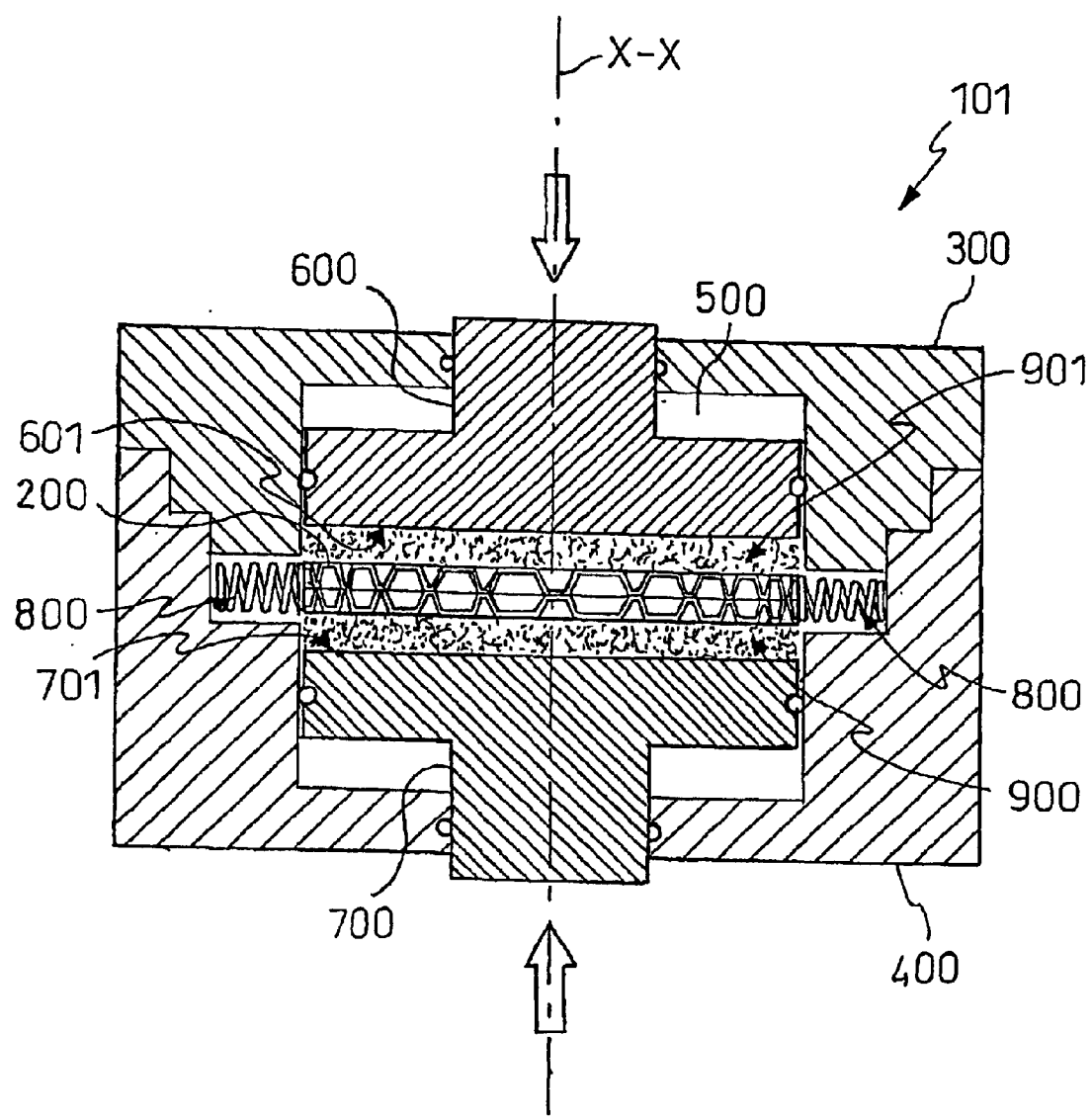
FIG. 4 shows, in section, a mould during the operative step for the moulding of a cover of a braking band according to the invention.

FIG. 4 shows the mould schematically, generally indicated 101.

The mould 101 comprises two plates 300 and 400 which, in operative conditions, are coupled in a leaktight manner to define a moulding cavity 500.

Two opposed pistons 600 and 700 are mounted inside the moulding cavity 500 and are slidable along a common axis X—X. These pistons 600 and 700 are constructed in a manner such as to form a seal against the internal walls of the moulding cavity 500.

In particular, the mould 101 has support means 800 for supporting the core 200, such as that produced by the process described above, between the two pistons 600, 700.

These support means 800 are preferably resilient means and, even more preferably, are springs.

The step of the moulding of the cover with the use of the above-mentioned cover-moulding mould will be described below with reference to FIG. 4.

First of all, when the mould 101 is in the open configuration (not shown), that is, when the two plates 300 and 400, with the respective pistons 600 and 700, are moved apart, a layer 900 of a mixture in the solid state, identical to the mixture described above with reference to the moulding of the core, is deposited in the moulding cavity 500. In particular, the layer 900 is deposited on the surface 701 of the piston 700 which faces the piston 600 of the plate 300.

The core 200 is then positioned on the layer 900 so as to cover it and, at the same time, in a manner such as to be kept suspended and not to sink into the mixture. This suspension is achieved by means of the above-mentioned support means 800.

After the core has been positioned inside the moulding cavity 500, a further layer 901 of the above-mentioned mixture is deposited on the core to produce a layered structure.

At this point, the mould 101 can be closed so that the lower surface 601 of the piston 600 comes into contact with the layer 901.

The cover can now be moulded by suitable heating and by a pressure exerted by the pistons 600 and 700 on the layers of mixture 900 and 901.

During the steps for the moulding both of the half-cores and of the covers according to the process of the invention, the mixture comprising the carbon-based fibres is heated in the mould to a temperature of from 80° C. to 180° C., preferably 100–120° C., and a pressure of between 0.1 N/cm$^2$ and 5 N/cM$^2$, preferably 0.5–1 N/cm$^2$ is applied thereto.

Upon completion of the moulding, a semi-finished product having a "sandwich" structure is produced and is removed from the mould and subjected to a first firing in a furnace at a temperature such as to bring about carbonization or pyrolysis of the resin.

This firing is performed in a conventional furnace at a temperature which depends substantially on the type of binder used and which is generally within the range of 900–1200° C.

The firing is performed in the presence of a flow of inert gas such as nitrogen or argon and under a plenum pressure of 10–100 mbars, preferably 20–30 mbars.

This flow also advantageously removes the gases which are liberated by the pyrolysis of the organic binder.

During this step of the process, the semi-finished product acquires a greater porosity, which is important during the subsequent firing since it allows the fused silicon to infiltrate into the semi-finished product.

According to one embodiment of the invention, the process may further comprise a step for the finishing of the surface of the semi-finished product coming from the first firing.

This advantageously enables any surface deformations of the semi-finished product to be removed by conventional apparatus so as to give it the desired shape.

The finishing step is preferably performed dry, for example, by diamonds, since the semi-finished product which, after the first firing, has acquired a predetermined porosity, might disadvantageously absorb liquid substances if the finishing were performed wet.

The fired semi-finished product is then subjected to a second firing in the presence of silicon at a temperature such as to bring about fusion of the silicon and its infiltration into the pores of the semi-finished product.

As stated above, the infiltration of the silicon increases the cohesion of the bundles of carbon filaments whilst, at the same time, the fused silicon reacts partially with the carbon of the semi-finished product in the conditions of the second firing, forming silicon carbides which have the effect of improving the cohesion characteristics of the material.

In order to perform the second firing, the semi-finished product, fired and possibly subjected to finishing, is inserted in the chamber of a container of a volume such that it can hold the semi-finished product together with the necessary quantity of silicon, the space formed between the semi-finished product and the container being filled with silicon which surrounds the semi-finished product. The quantity of silicon used is therefore that required to fill the porosity of the semi-finished product, or a slightly greater quantity.

The above-mentioned space is filled with pure silicon or with an alloy of silicon and aluminium or copper, in granular or powder form.

The chamber may be in communication with the exterior by means of suitable holes which allow gases liberated during the firing to escape.

After the silicon has been loaded, the container is inserted in a suitable, conventional furnace, heated to a temperature of 1400–1700° C.

At the above-mentioned temperatures, the silicon melts and infiltrates the pores of the semi-finished product (silication).

The firing is performed under reduced pressure, the pressure being reduced by from 900 mbars to 300 mbars, preferably by from 800 to 500 mbars.

Upon completion of the firing, the core and/or the cover is cooled, for example, with argon or, preferably, with nitrogen, so that the residual silicon solidifies in small spheres which can easily be recovered from the container.

The core and/or the cover according to the invention, thus obtained, may be subjected to finishing operations, for example, surface finishing, which may be performed dry or wet, in conventional manner.

Clearly, the furnace firing steps, that is, the pyrolysis and silication steps, could take place in a single furnace, reducing production times and the complexity of the apparatus.

With the process for the moulding of a braking band according to the present invention, a braking band which has optimal characteristics of compactness can thus be produced easily and inexpensively.

Moreover, it is known that, in some cases, braking bands constructed with the materials set out above may give rise to cracks or fractures as a result of thermal and/or compression stresses to which a braking band is subject during use. These cracks or fractures tend to be propagated rapidly throughout the structure of a braking band and may cause it to disintegrate completely.

A plurality of reinforcing fibres may advantageously be introduced into the mixture for the moulding of the above-described core and/or of the covers, so as to hinder the propagation of cracks.

The reinforcing fibres preferably extend concentrically and/or radially in the structure of the braking band according to the invention, throughout its shape.

Alternatively, the reinforcing fibres may be provided only in some regions of the braking band, in accordance with the regions in which cracks or their propagation paths arise, both of which can be predicted on the basis of structural calculations.

For example, the crack-propagation paths are more likely to be arranged radially and are propagated outwardly from the interior to bring about explosion of the braking band.

The propagation of the cracks in a braking band is therefore hindered by arranging the reinforcing fibres along concentric annular portions of the band.

It is important that the reinforcing fibres have satisfactory characteristics of cohesion with the other components of the mixture of the braking band according to the invention to prevent the entire structure from disintegrating during use, even in the absence of cracks or fractures.

Moreover, the reinforcing fibres must be substantially inert with regard to the components of the mixture and sufficiently able to withstand the pyrolysis and silicon-infiltration temperatures, to avoid their degradation during the preparation of the braking band according to the invention.

For this purpose, the material of the reinforcing fibres is preferably constituted by carbon fibres. It is, however, possible to use other materials such as SiC, $Si_3N_4$, or TiC, as well as metallic materials, for example, platinum, which can withstand the temperatures of the interaction with silicon.

The reinforcing fibres may be incorporated in the core and/or in the cover of the braking band according to the invention in various ways. For example, the reinforcing fibres may be arranged in a plurality of bundles which are arranged in predefined directions.

These directions may be warp and weft directions, the bundles forming a fabric.

Alternatively, several combined or intertwined bundles of reinforcing fibres form a single warp or weft thread to constitute the fabric.

The fabric may comprise from 2 to 30 fibres per cm, preferably 5–8 fibres/cm.

Instead of arranging the fibres in the mixture so as to form a fabric as defined herein, a preformed fabric may advantageously be inserted directly in the mixture.

Alternatively, the reinforcing fibres may constitute a non-woven fabric, for example, a felt.

The reinforcing fibres may also be arranged in layers both in the core and in the cover or in only one of these two.

When the reinforcing fibres are constituted by a fabric or by a non-woven fabric, they are bi-directional and can therefore be arranged so as to be either coplanar with or perpendicular to the plane in which the braking band lies.

The contents of the components of the mixture used to form the core and/or the cover according to the invention may vary as percentages by volume relative to the volume of the material as follows:

bundles of filaments 40–70%, preferably 50–60%;
binder 5–30%, preferably 15–25%;
additives 0.5–20%, preferably 1–15%;
reinforcing fibres 4–30%, preferably 10–20%.

In the process according to the invention, the bundles of filaments may have diameters of from 0.1 to 2 mm, preferably from 0.3 to 0.5 mmm.

It should be noted in particular that, in the absence of the reinforcing fibres, the content of bundles of filaments in the mixture may vary from 50 to 80% by volume relative to the volume of the mixture and is preferably within the range of 60–70%.

The bundles of filaments and/or the reinforcing fibres may be advantageously coated beforehand with a protective resin, preferably polyurethane, before being used in accordance with the process of the invention.

Alternatively, the bundles of filaments and the reinforcing fibres may be coated beforehand with the same organic binder which is used for the preparation of the mixture.

Greater cohesion of the material and a more compact product are thus obtained.

During the first firing of the semi-finished product, the resin and the organic binder carbonize, creating a protective layer on the bundles of filaments and on the reinforcing fibres, preventing any disintegration or even dissolving thereof during the subsequent treatment with silicon.

The bundles of filaments and the reinforcing fibres therefore retain their original shapes throughout the process, thus producing a product with good characteristics of cohesion and strength.

The organic binder is a conventional binder which may be selected from the group comprising phenolic and acrylic resins, paraffin, pitches, polystyrenes, etc.

The binder is preferably selected from the group comprising pitches and phenolic resins.

The binder may be added to the mixture in any desired form, for example in the solid, semi-liquid, or liquid state, or in solution.

For example, phenolic resin may be added in the form of pellets, powder, or granules.

The content of organic binder in the mixture may vary from 5% to 30% by volume relative to the volume of the mixture and is preferably within the range of 20%–26%.

The mixture may also contain other conventional additives used as fillers and, indirectly, for regulating the porosity and the density of the desired composite material.

These additives are constituted by particles of inorganic materials such as, preferably, graphite, silicon carbide, or metal carbide or nitride powders.

The content of additives in the mixture may vary from 0.7% to 23% by volume relative to the volume of the mixture and is preferably within the range of 9%–15%.

The mixing may be performed in conventional manner and with conventional apparatus and the bundles of filaments are arranged randomly in various directions.

The reinforcing fibres may be incorporated in the mixture in various ways.

According to a preferred method of implementing the process according to the invention, this incorporation is performed by the following steps:

i) placing a first layer of the mixture in the moulding cavity of the mould for the core and/or for the cover, ii) adding, to the first layer of mixture, the plurality of reinforcing fibres which extend along the shape in a manner such as to hinder the propagation of cracks, and iii) placing a second layer of the mixture on the first layer so as to incorporate the plurality of reinforcing fibres completely in the mixture.

Clearly, the above-described layering steps may be repeated a predetermined number of times so as to produce a multi-layer core and/or cover in which each layer of reinforcing fibres is incorporated between two layers of mixture comprising bundles of filaments.

FIG. 2 shows two complementary half-cores 2 produced in accordance with the above-described process for the moulding of a core.

In particular, the half-cores 2 are annular in shape and each has an outer face 20, an inner face 21, an outer peripheral edge 22, and an inner peripheral edge 23.

Grooves 24 extend through the outer face 20 and, preferably, are arranged radially, are spaced apart uniformly by flat portions 25, and extend through the outer face 20 from the outer peripheral edge 22 to the inner peripheral edge 23 of the half-core 2.

The inner face 21 also has grooves 26 formed in the region of the flat portions 25.

In particular, the circumferential extent of the grooves 26 is greater than that of the corresponding grooves 24 and, moreover, the grooves 26 open in the outer peripheral edge 22, but terminate against a closure wall 27 in the region of the inner peripheral edge 23.

In FIG. 3, two half-cores 2 have been fitted together to form a core 200 of a braking band according to the present invention. As can be seen, the half-cores 2 have been fixed together with the two respective complementary inner faces 21 cooperating to form venting passages 28 of a braking band.

In other words, each groove 26 of each of the two half-cores 2 forms a channel which is connected to a corresponding channel in order to close the venting passage or duct 28.

The venting passages 28 are thus open at the outer peripheral edge 22, but are closed by the walls 27 at the inner peripheral edge 23 of each of the two half-cores 2.

As already described fully above, two covers 8 are moulded directly onto the core 200 and, in particular, onto the respective outer faces 20 of the half-cores 2. FIG. 5 shows a braking band 10 comprising the core 200 and two covers 8 arranged so as to produce a "sandwich" structure.

Moreover, the braking band 10 has an outer peripheral edge 11 having openings 12 corresponding to the venting passages 28 described above, and an inner peripheral edge 13 provided with seats 14 which extend for a predetermined distance towards the outer peripheral edge 11.

In particular, these seats 14 are such as to house corresponding teeth of a brake disk bell (not shown).

The above-described step of the moulding of the half-cores may be performed with a suitable mould which will now be described below.

Figure 1:
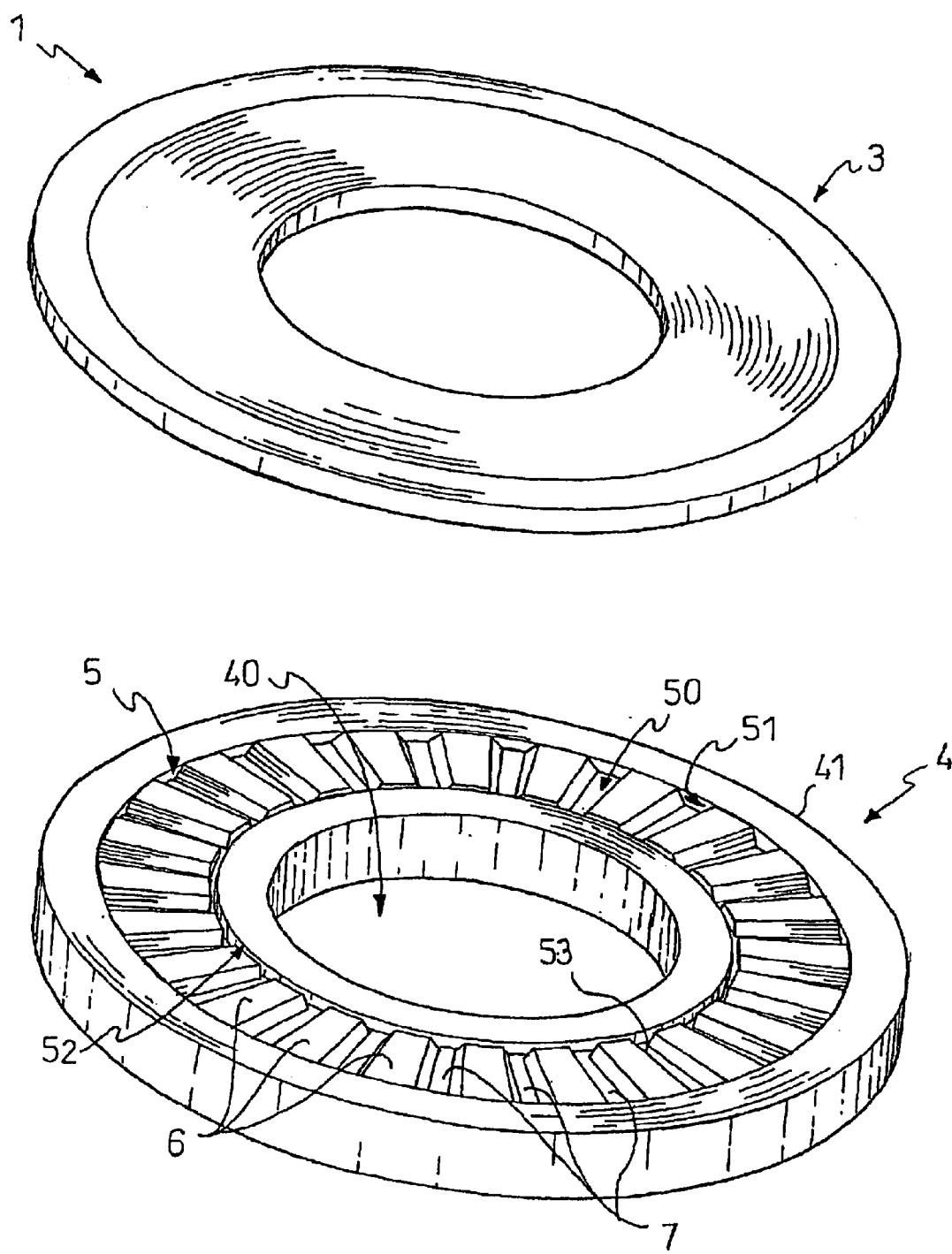
FIG. 1 is a schematic perspective view of an open mould for the production of a half-core of a braking band according to the invention.

FIG. 1 shows schematically a mould 1 for moulding a half-core, in which two plates 3 and 4 are disposed facing one another. Once these plates 3 and 4 have been brought into contact, they define an internal cavity which constitutes the moulding cavity of the mould 1.

Only one of the two plates, that is, the plate 4, will now be described, since the other plate is substantially complementary.

The plate 4 is in the form of a ring 41 defining a central opening 40. The ring 41 has a central cavity 5 which, with a corresponding cavity provided in the plate 3, defines the cavity for moulding the core.

The central cavity 5 is formed by a base 50, an outer side wall 51 and an inner side wall 52. The outer side wall 51 is positioned in the vicinity of the periphery of the mould 1 and the inner side wall 52 is positioned in the vicinity of the central opening 40 of the mould 1.

Moreover, the central cavity 5 has projections 6 spaced apart by grooves 7. The projections 6 are intended to form the surfaces of the venting passages of the braking band of the invention. The grooves 7, on the other hand, will form the points of interruption between the passages.

In particular, the projections 7 extend radially from the outer side wall 51 of the central cavity 5 towards the inner side wall 52 of the central cavity 5. These projections preferably terminate a predetermined distance form the inner side wall 52 so as to define a form of circular channel 53 in the central cavity 5.

It should be noted that the wall 27 of each half-core 2 is formed by means of the particular channel 53.

Figure 7:
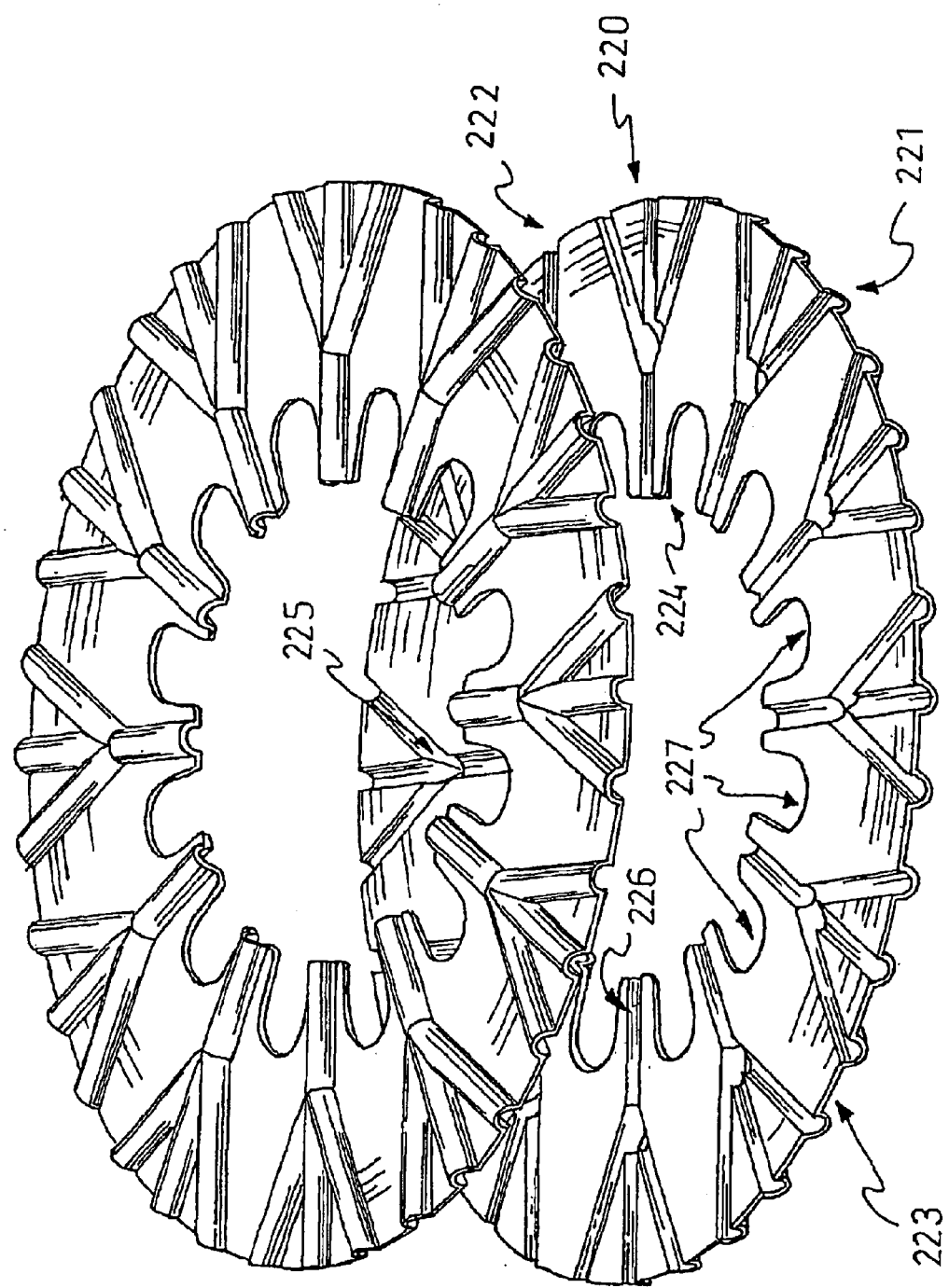
FIG. 7 is a perspective view of two facing half-cores produced with the mould of FIG. 6.
Figure 8:
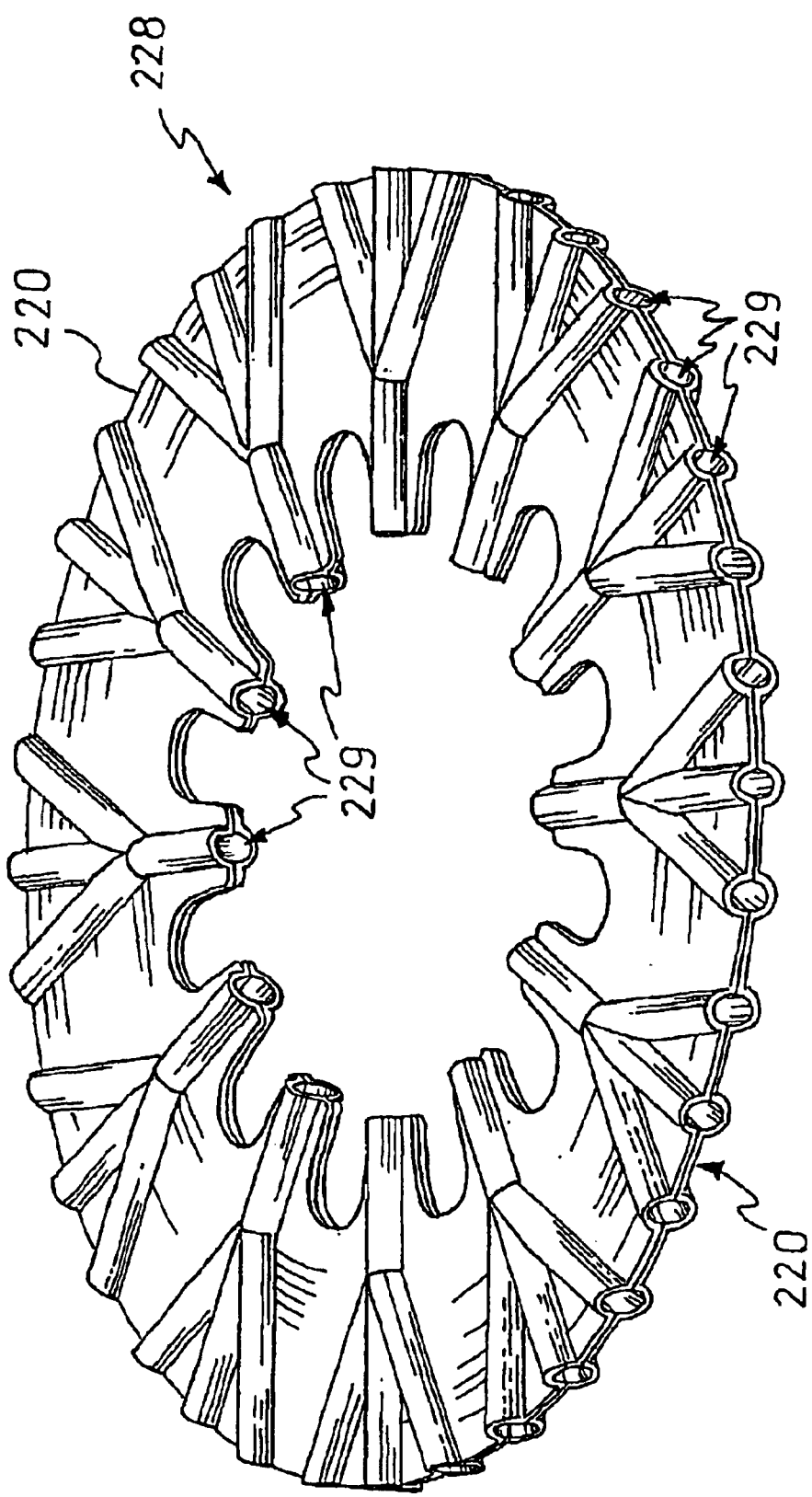
FIG. 8 is a perspective view of a core of a braking band produced by joining together the two half-cores of FIG. 7.
Figure 9:
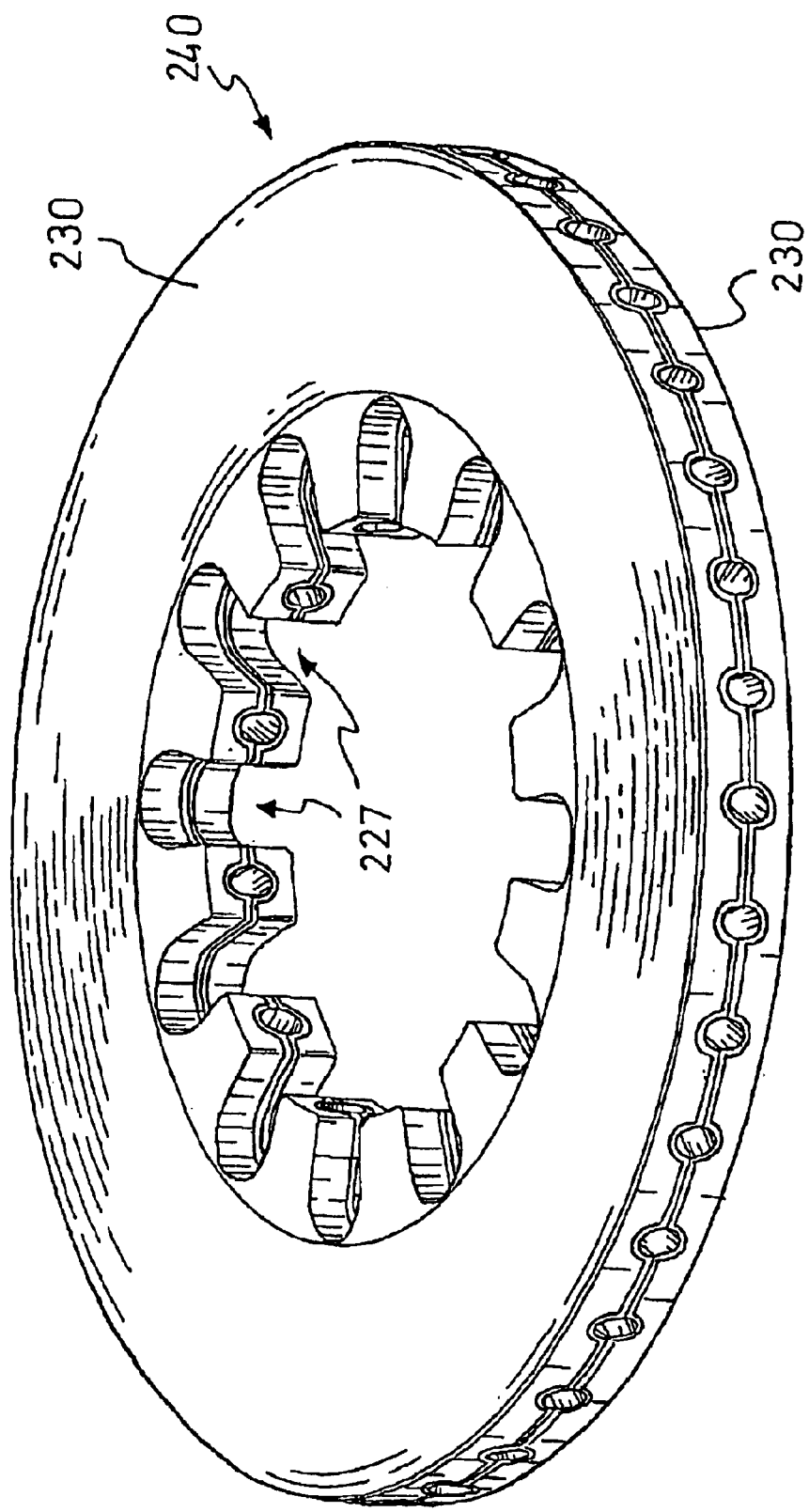
FIG. 9 is a perspective view of a braking band according to a variant of the invention.

According to a variant of the present invention and with reference to FIGS. 7, 8 and 9, the half-cores described above may have different shapes.

In particular, FIG. 7 shows two identical facing half-cores 220. The half-cores 220 are also annular and each has an outer face 221, an inner face 222, an outer peripheral edge 223, and an inner peripheral edge 224.

Grooves 225 extend though the inner face 222 from the outer peripheral edge 223, groups of three grooves 225 converging into a single groove 226 which opens in the inner peripheral edge 224.

Moreover, the inner peripheral edge 224 has seats 227 which extend towards the outer peripheral edge 223 between adjacent grooves 226.

In FIG. 8, the two half-cores 220 have been fitted together to form a core 228 of a braking band according to the present invention. As can be seen, the two half-cores 220 have been fixed together with the two respective complementary inner faces 222 cooperating to form the venting passages 229 of a braking band.

In particular, the respective grooves 225 and 226 of each of the two half-cores 220 constitute channels which are fitted together to define the venting passages 229.

The venting passages 229 are thus open both at the outer peripheral edge 223 and at the inner peripheral edge 224 of the half-cores 220.

Figure 5:
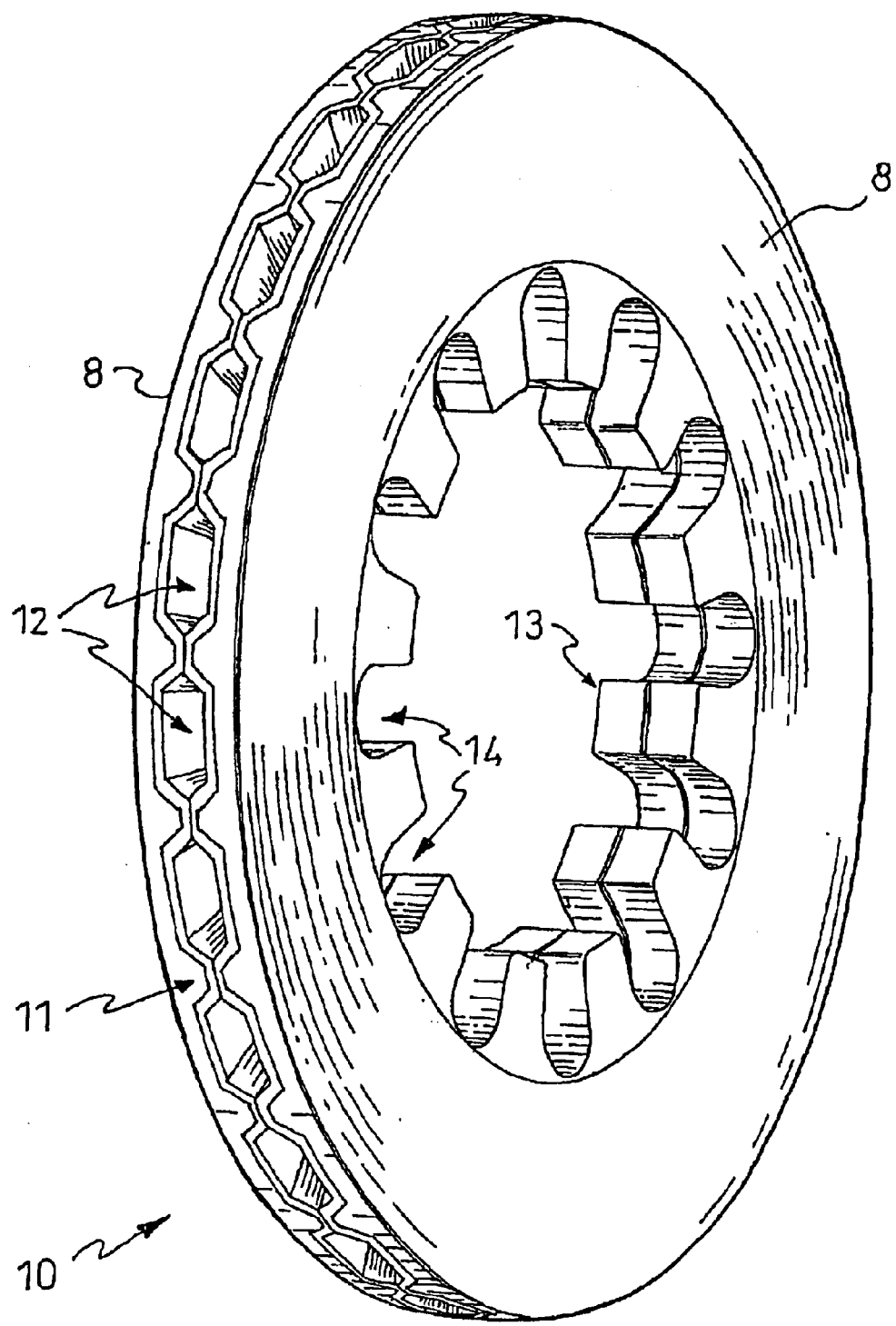
FIG. 5 is a perspective view of a braking band according to the invention.

Two covers 230 are moulded directly onto the core 228, as described above with reference to the braking band 10 of FIG. 5.

The core 228 is thus enclosed like a "sandwich" between the two covers 230 so as to form a braking band 240 (FIG. 9).

It should be noted that, in this embodiment of the invention, the seats 227 described above correspond to the seats 14 of the braking band 10 and, in the same manner as the latter, are intended to be coupled with corresponding teeth of a brake disk bell (not shown).

Moreover, the above-described step of the moulding of the half-cores may be performed by adapting the mould used for the production of the half-cores 2 of FIG. 2.

Figure 6:
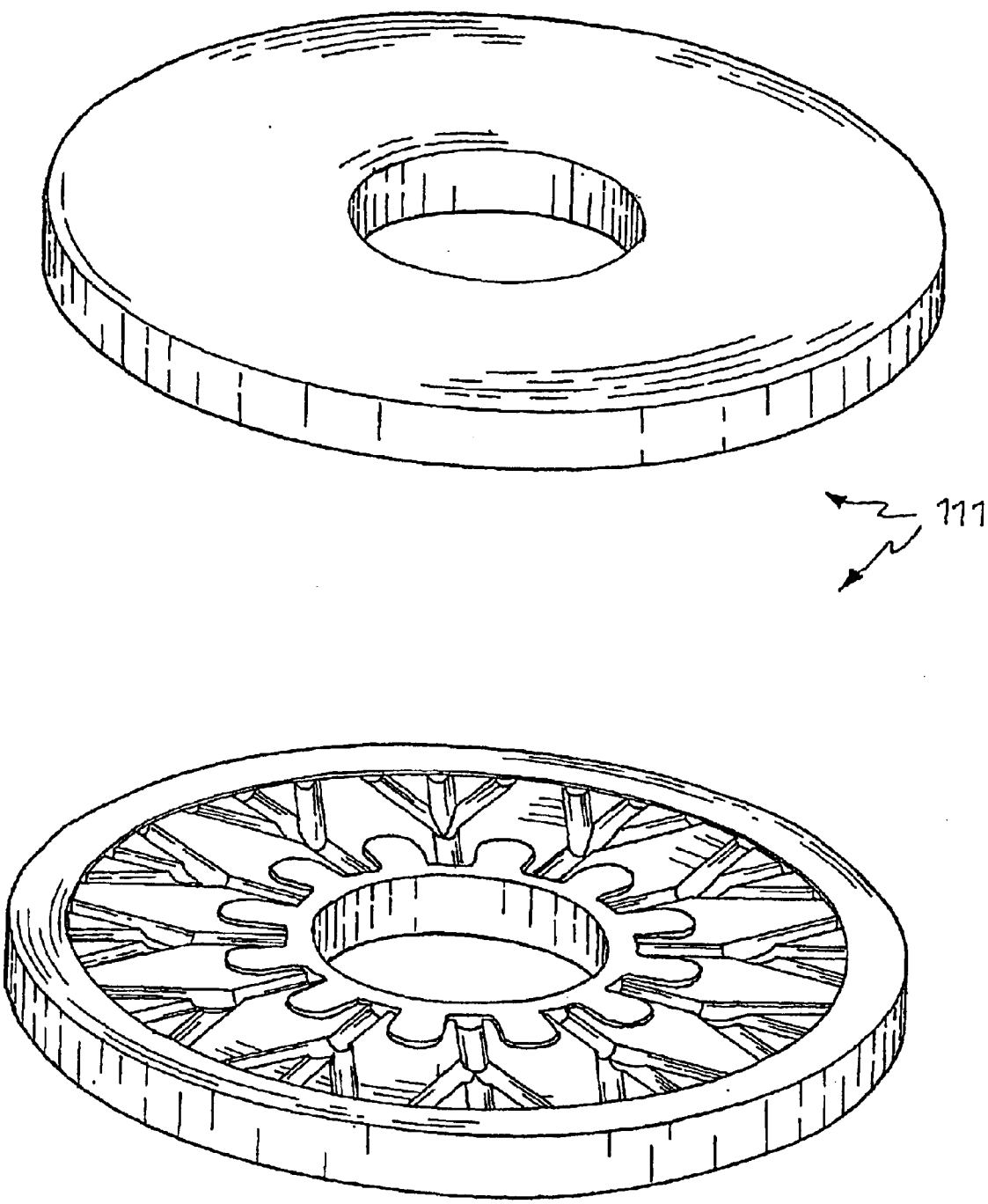
FIG. 6 is a schematic perspective view of an open mould for the production of a half-core of a braking band according to a variant of the invention.

FIG. 6 shows schematically a mould 111 for the production of the half-cores 220. It is clear that the moulding cavity of the mould constitutes precisely an impression of the half-cores 220 and it will not therefore be described in detail.

The advantage provided by the particular shape of the core 228 lies in the fact that, as well as increasing the heat-exchange surface, it also permits an air-flow through the band, improving its heat-dissipation efficiency.

The advantage of the process for the production of a braking band according to the invention is that can be implemented easily and inexpensively. In fact, both the mould for moulding the core and the mould for moulding the cover are particularly simple, easy to produce and easy to use.

Moreover, it should be noted that the braking band according to the invention can be produced with the aid of conventional techniques used for the production of the corresponding known braking bands and, moreover, the quantity of reinforcing fibres added to the material is relatively low (no greater than 30% by volume).

In addition, the particular use of the resilient means 800 provides a suitable support for the core and at the same time achieves optimal balancing of the pressures exerted by the two pistons 600 and 700 during the moulding of the covers.

It is also clear that the braking band according to the invention is distinguished by its optimal friction characteristics, its hardness, bending strength, resistance to wear and to heat generated by friction, and impact and compression strength.

In particular, it should be noted that the absence of an adhesive layer of any type between the covers and the core of the braking band produced in accordance with the invention both simplifies the entire structure of the band and produces a structure stronger than that of the prior art.

The present invention is thus realized by the implementation of a simple and inexpensive process which also produces a braking band with the appropriate safety characteristics from the structural point of view and from the point of view of easy production.

Naturally, in order to satisfy contingent and specific requirements, an expert in the art may apply to the above-described process and to the braking band many modifications and variations all of which are included within the scope of the invention as defined by the appended claims.

What is claimed is:

1. A process for the production of a braking band (10; 240) having venting passages (12; 229), comprising the following steps:
   moulding a core (200; 228) of the braking band in a suitable mould (1; 111),
   moulding two covers (8; 230) onto the core in a further suitable mould (101) so as to form a semi-finished product having a "sandwich" structure,
   firing the semi-finished product so as to produce a predetermined porosity of the covers,
   firing the semi-finished product further, in the presence of silicon, at a temperature such as substantially to bring about fusion of the silicon and its infiltration into the covers.

2. A process for the production of a braking band (10; 240) according to claim 1, in which the step of moulding the core (200; 228) of the braking band comprises the moulding of two half-cores (2; 220) and the juxtaposition and fixing-together thereof to form the core with the venting passages (12; 229).

3. A process for the production of a braking band (10; 400) according to claim 2 in which the moulding of the half-cores comprises the steps of:
   a) providing a suitable mould (1; 111),
   b) preparing a mixture comprising a predetermined quantity of fibres and/or filaments constituted substantially by carbon, and a predetermined quantity of an organic binder,
   c) depositing the mixture in the suitable mould,
   d) moulding a first half-core (2; 220) in the mould,
   e) moulding a second half-core (2; 220) by repeating steps a) to d),
   f) fixing the juxtaposed first and second half-cores together to produce the core in which the venting passages (28; 229) are defined.

4. A process for the production of a braking band according to claim 3 in which the mixture for the moulding of the core comprises filaments of carbon-based materials selected from the group consisting of wood and products of the processing of wood, vegetable fibres, and thermosetting resins.

5. A process for the production of a braking band according to claim 4 in which the materials are sawdust or chippings, hemp and the like, and liquid thermosetting phenolic resins.

6. A process for the production of a braking band according to claim 3 in which the fixing takes place by gluing with a liquid thermosetting resin.

7. A process according to claim 6 in which the resin is a phenolic resin.

8. A process for the production of a braking band according to claim 6 in which the gluing takes place when the first and second half-cores have just come out of the mould.

9. A process for the production of a braking band according to claim 1 in which the step of moulding the covers (8; 230) comprises:
   providing a suitable mould (101),
   depositing a first layer of a mixture in the suitable mould, the mixture comprising a predetermined quantity of fibres and/or filaments constituted substantially by carbon, and a predetermined quantity of an organic binder,
   positioning and supporting the core (200; 228) in the mould so that it is in contact with the first layer of mixture,
   depositing a second layer of the mixture on the core,
   moulding the covers around the core so as to produce a "sandwich" structure.

10. A process for the production of a braking band according to claim 3 in which the step of moulding the covers (8; 230) comprises:

providing a suitable mould (101), depositing a first layer of a mixture in the suitable mould, the mixture comprising a predetermined quantity of fibres and/or filaments constituted substantially by carbon, and a predetermined quantity of an organic binder, positioning and supporting the core (200; 228) in the mould so that it is in contact with the first layer of mixture, depositing a second layer of the mixture on the core, moulding the covers around the core so as to produce a "sandwich" structure.

11. A process for the production of a braking band (10; 240) according to claim 9 in which the core (200; 229) is supported in the mould so as to float on the first layer of mixture, by means of resilient elements (800), the elements preferably being springs.

12. A process for the production of a braking band (10; 240) according to claim 10 in which the mixture for the moulding of the core and/or of the covers comprises reinforcing fibres of carbon or of metallic materials.

13. A process for the production of a braking band according to claim 12 in which the reinforcing fibres are SiC, $Si_3N_4$, TiC, or platinum fibres.

14. A process for the production of a braking band according to claim 12 in which the reinforcing fibres are combined with one another or intertwined in bundles which form a single warp or weft thread to constitute a fabric.

15. A process for the production of a braking band according to claim 12 in which the reinforcing fibres constitute a non-woven fabric.

16. A process for the production of a braking band according to claim 15 in which the non-woven fabric is a felt.

* * * * *